Oct. 28, 1969  R. H. FAIRBANK ET AL  3,474,607
SELF-PROPELLED WINDROWER

Filed Dec. 27, 1966 3 Sheets-Sheet 1

INVENTORS
R.H. FAIRBANK
J.P. LEINHAUSER
D.E. BURROUGH

Oct. 28, 1969  R. H. FAIRBANK ET AL  3,474,607
SELF-PROPELLED WINDROWER
Filed Dec. 27, 1966  3 Sheets-Sheet 3

INVENTORS
R.H. FAIRBANK
J.P. LEINHAUSER
D.E. BURROUGH

United States Patent Office 3,474,607
Patented Oct. 28, 1969

3,474,607
SELF-PROPELLED WINDROWER
Raymond Harry Fairbank, Joe Paul Leinhauser, and Donald E. Burrough, Ottumwa, Iowa, assignors to Deere & Company, Moline, Ill., a corporation of Delaware
Filed Dec. 27, 1966, Ser. No. 604,870
Int. Cl. A01d 67/00, 75/28
U.S. Cl. 56—209                                    10 Claims

ABSTRACT OF THE DISCLOSURE

A self-propelled windrower has a mobile main frame and a forward transversely elongated harvesting platform, is mounted on the main frame by a pair of transversely spaced parallelogram type linkage which permit independent vertical adjustment of the opposite ends of the platform. The position of the platform is controlled by a pair of independently actuatable hydraulic cylinders which permit independent adjustment of the opposite ends of the platform and connected to the platform through adjustable tension springs which provide independent floating action of the opposite end of the platform.

---

This invention relates to a harvesting machine of the type known as a self-propelled swather or windrower, and more particularly to improved means for mounting the harvesting platform or header on such a machine.

A self-propelled windrower conventionally includes a relatively light-weight traction unit carrying a forwardly disposed harvesting device, such as a windrower platform, which typically includes a transversely elongated cutting mechanism and a transverse conveyor, which receives the cut crop as it moves rearwardly over the cutting mechanism and deposits it in a windrow on top of the stubble. The header or platform is conventionally mounted for vertical adjustment on the traction unit, so that the platform may be raised for transport and the height at which the crop is cut may be varied. Generally, the platform is also freely raisable from its operating position upon striking an obstruction or ground irregularity so that the cutting mechanism may be operated close to the ground without damaging the platform components.

It is known to provide counterbalance springs to aid the raising of the platform when the platform strikes an obstruction. However, heretofore the counterbalance springs have generally extended between the frame of the traction unit and the platform, independently of the platform suspension mechanism. Thus, the deflection of the spring and the counterbalance force exerted thereby have varied according to the position of the platform relative to the traction unit, the lower the operating height of the platform the greater the counterbalancing force. The springs are generally set so that the optimum force is exerted when the platform is riding on the ground. Since the lengths of the springs are limited, the counterbalancing force has rapidly decreased as the platform raises from the ground. Tests have shown that the force necessary to raise most platforms doubles when the platform is raised less than one foot. This, of course, partially defeats the purpose of the counterbalancing.

The primary object of the present invention is to provide improved means for mounting the platform on the traction unit, including an improved platform counterbalancing system, wherein the counterbalancing force is unaffected by the operating position of the platform.

Another feature of the invention resides in the platform suspension and lifting arrangement. Heretofore, vertical adjustment of the platform on the traction unit has been accomplished by one or more force-exerting devices, such as hydraulic cylinders, acting between the traction unit and the platform, the platform generally being mounted for vertical adjustment on some type of parallel linkage. While previous platform suspension linkages have permitted some degree of platform tilt about a fore-and-aft axis, either through a tiltable linkage or by the provision of sufficient play in the linkage pivots, in order that one end of the platform could raise to clear an obstruction or ride along an elevation, such as an irrigation border, the platform could be raised or operated above the ground only in a level condition, the lift cylinders being connected and actuated in unison.

Another object of the invention is to provide a platform mounting means which permits tilting of the platform by either contact of one end of the platform with the ground or by means of hydraulic lifting cylinders, and further to provide completely independent lifting cylinders for controlling the opposite ends of the platform.

Another object is to provide counterbalancing springs in series with the lift cylinders, so that the counterbalance of the opposite ends of the platform is unaffected by the operating height as established by the lifting cylinders, and further to provide a counterbalancing means which can be equally effective whether the platform is operating in a level or tilted position.

Still another object is to provide a platform suspension system which is of simple and rugged construction, and which is simple for the operator to control.

These and other objects will become apparent from the following detailed description and accompanying drawings wherein.

Figure 1:
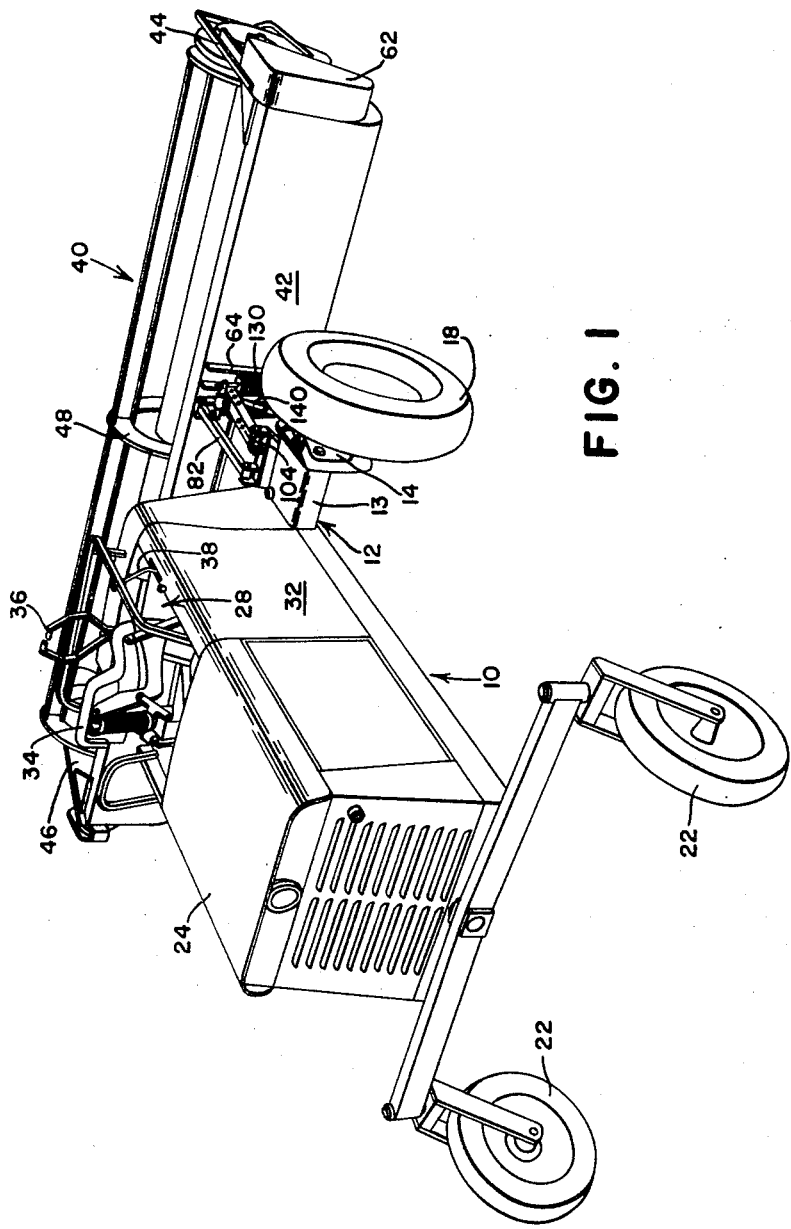
FIG. 1 is a right rear perspective of a windrower having an auger type platform and embodying the present invention.

The overall construction of the windrower in which the invention is embodied in shown in FIG. 1. The windrower includes a main frame or chassis, indicated in its entirety by the numeral 10, and having a transverse forward portion 12, which includes a hollow rectangular transverse beam 13 and right and left wheel supporting structures 14 and 16, respectively mounted at the opposite ends of the beam 13. The frame 10 is supported above the ground on right and left drive wheels 18 and 20, respectively mounted on the right and left wheel supporting structures, and a pair of caster type rear wheels 22.

Figure 2:
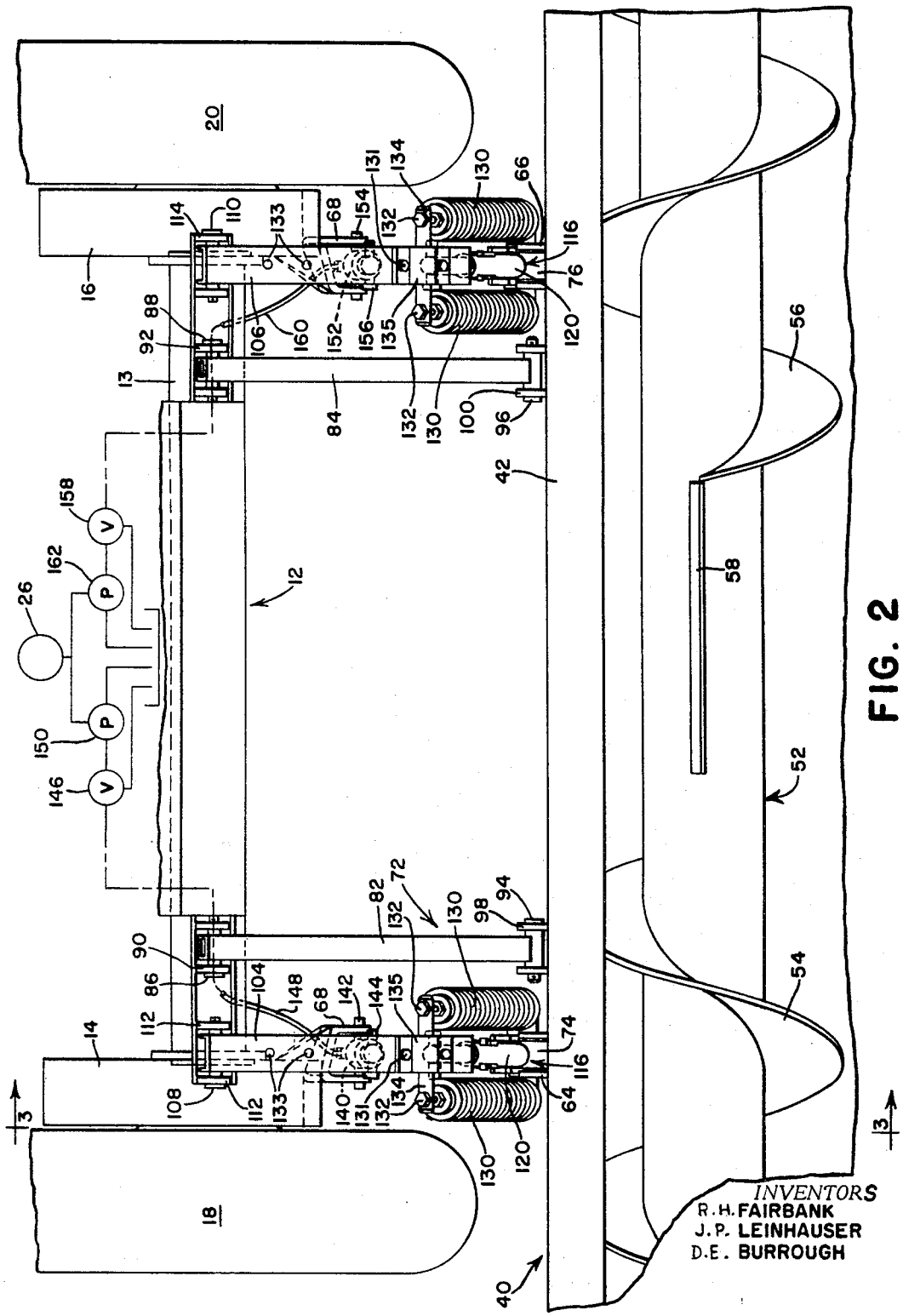
FIG. 2 is an enlarged fragmentary plan view of the platform suspension area of the windrower, schematically showing the hydraulic controls for the platform suspension.
Figure 3:
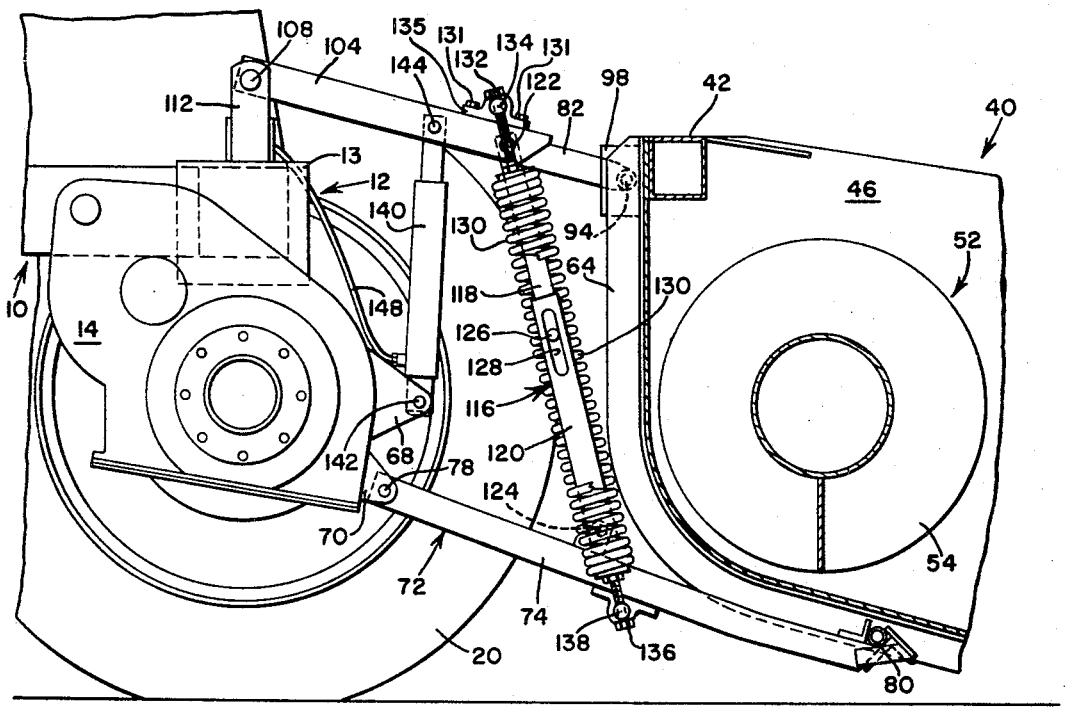
FIG. 3 is a fragmentary elevation section as viewed along the line 3—3 of FIG. 2.

It is to be understood that such terms as "fore-and aft," "forward," "rearward," "upper," "lower," etc. are words of convenience, used to more clearly described the invention, and are not be construed as limiting terms, and that such words as "right," "left," "forward," and "rearward" are with reference to a person facing in the direction of machine travel (to the right in FIG. 3 and downwardly in FIG. 2).

Mounted on the rearward part of the frame is an engine enclosure or hood 24 which houses a conventional internal combustion engine 26, which is not shown in FIG. 1 but is schematically shown in FIG. 2. An operator's station 28 is located on the forward portion of the frame 10, forwardly of the engine enclosure 24, and is partially enclosed by an upright front panel 30 and opposite side panels 32. The operator's station conventionally includes an operator's seat 34 from which the operator manipulates the various controls, such as the speed and steering controls 36 and a throttle control 38.

The above-described traction unit carries a transversely elongated forwardly disposed harvesting device or header 40, here shown as an auger type windrower platform, including a transversely elongated header frame or body 42 open upwardly and forwardly and having right and left end panels 44 and 46 respectively. As is apparent from the drawings, the header 40 is substantially wider than the traction unit, the opposite ends of the header extending transversely beyond the right and left drive wheels 18 and 20. The illustrated header includes a forwardly disposed, axially transverse reel 48, journaled at opposite ends in the side panels 44 and 46, a transversely elongated cutting mechanism 50, mounted on the lower part of the header body 42 coextensive with and below the reel 48, and a transverse auger 52, journaled at opposite ends in the end panels 44 and 46 rearwardly of the cutting mechanism and having oppositely wound auger flights 54 and 56 at its opposite ends, the auger flights terminating in a pair of paddles 58 in the central portion of the auger. For purpose of clarity, the reel 48 is omitted in FIG. 4, and the cutting mechanism 50 is not shown in detail. The reel 48, the cutting mechanism 50, and the auger 52 are connected to and driven by the engine 26 by conventional drive, part of the drive being enclosed in a drive shield 62 at the right end of the header 40. The reel 48 combs the crop material rearwardly to the cutting mechanism 50 as the machine advances and then moves the severed crop rearwardly to the auger 52, which converges the crop, the paddles 58 projecting the crop rearwardly through a central opening 60 in the rear portion of the header body 42. The crop moving through the discharge opening 60 is normally deposited in a windrow on top of the crop stubble from which it is picked up by a different machine in a subsequent harvesting operation. In some crops, such as hay or the like, a pair of crop conditioner rolls are connected to the header or to the main frame rearwardly of the discharge opening to crush or crimp the crop before it is finally deposited in the windrow to accelerate the curing of the crop, although the illustrated windrower does not include such a device.

A pair of arcuate fore-and-aft and vertically extending channel like header frame members 64 and 66 are respectively attached to the rearward and lower side of the header body 42 forwardly of the right and left wheel support structures 14 and 16, the closed side of the channel-like frame members 64 and 66 conforming to and abutting the rearward and lower portions of the header body 42. Each wheel support structure 14 and 16 includes a pair of forwardly extending, transversely apertured ears 68 and 70 which are in substantial vertical alignment.

The harvesting device or header 40 is mounted for generally vertical adjustment relative to the main frame 10 by a parallel type mounting mechanism, indicated in its entirety by the numeral 72, so that the attitude of the header 40 is substantially the same regardless of its vertical position relative to the main frame 10. The mounting mechanism 72 includes a pair of parallel, generally fore-and-aft extending, lower links or mounting elements 74 and 76, swingably mounted at their rearward ends on transverse pivots 78 mounted in the apertures of the lower ears 70. The forward ends of the mounting elements 74 and 76 are respectively pivotally connected to the channel-like platform frame members 64 and 66 via transversely aligned pivots 80 mounted in the frame members 64 and 66 on the lower side of the header body 42 below the auger 52.

The mounting mechanism 72 also includes a pair of upper mounting elements or links 82 and 84, respectively parallel to and in approximate vertical alignment with the lower mounting elements 74 and 76. The rearward ends of the upper links 82 and 84 are respectively connected to the main frame 10 via transversely aligned pivots 86 and 88 respectively mounted in upright brackets 90 and 92 extending upwardly from the transverse beam 13 on opposite sides of the operator's station 28. The forward ends of the upper links 82 and 84 are pivotally connected to the header 40 via transversely aligned pivots 94 and 96, respectively carried by transversely apertured brackets 98 and 100 mounted on the upper rear edge of the header body 42 respectively adjacent the upper ends of the frame members 64 and 66.

Figure 4:
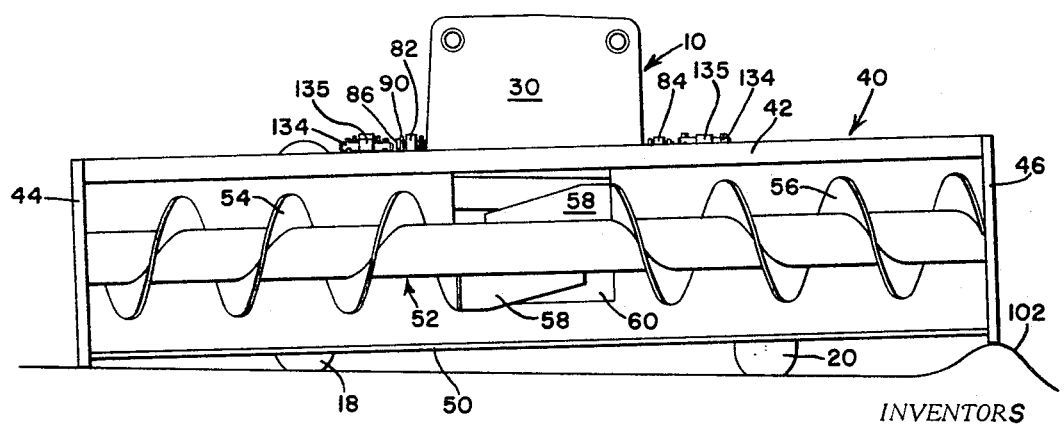
FIG. 4 is a front elevation of the windrower on a reduced scale, showing the platform being operated in a tilted condition.

Sufficient play is provided in the above-described upper and lower link pivots to permit a relatively small degree of header tilt about a fore-and-aft axis, either end of the header being capable of vertical movement independent of the opposite end, so that one end of the header is raisable upon striking an obstruction or ground irregularity or for operation at an elevated level relative to the opposite end, such as when the windrower is being operated along an irrigation border or the like, such as is indicated by the numeral 102 in FIG. 4.

The movement of the mounting mechanism 72 and consequently the position of the header 40 relative to the main frame 10 is established by a control system which includes a pair of generally fore-and-aft guide arms 104 and 106 respectively in substantial vertical alignment with the lower mounting elements 74 and 76 and pivotally mounted at their rearward ends for swinging in vertical arcs about transverse pivots 108 and 110, which are in substantial transverse axial alignment with the pivots 86 and 88 and are respectively mounted in upright brackets 112 and 114 respectively extending upwardly from the beam 13 adjacent to and on the exterior sides of the brackets 90 and 92. The forward ends of the guide arms 104 and 106 are respectively connected to the lower mounting elements 74 and 76 by a pair of lost motion members 116, which permit a limited amount of vertical movement of the guide arms relative to the lower mounting elements. The members 116 include upper and lower telescoping cylinders 118 and 120, the upper cylinders 118 being pivotally connected to the guide arms 104 and 106 at 122 and the lower cylinders 120 being pivotally connected to the lower mounting elements at 124. The upper or inner cylinder 118 carries a transverse pin 126, which slides in a longitudinal slot 128 in the lower or outer cylinders 120, the movement between the upper and lower cylinders 118 and 120, and consequently between the forward end of the guide arms and the lower mounting elements, being limited by the pin 126 engaging the opposite ends of the slot 128.

A pair of parallel, helical-type tension springs 130 extends between each lower mounting element and its respective guide arm, the upper end of each spring 130 being adjustably and pivotally connected to its respective guide arm by a threaded adjusting member 132, which is axially adjustable in a transverse pivot 134 carried by a bracket 135 mounted for selective fore-and-aft adjustment along the guide arms via fasteners 131 insertable into alternate mounting holes 133 in the respective guide arm. Each pair of tension springs 130 is normally disposed on opposite sides of the member 116 and is connected to the forward end of the respective guide arm, as shown in FIG. 3. The lower end of each spring 130 is adjustably and pivotally attached to its respective lower mounting element approximately at the center of the element by means of a threaded adjusting member 136 axially threadable in a transverse pivot 138 carried by the lower mounting element.

The position of the right guide arm 104 is established by a generally upright hydraulic cylinder 140, pivotally connected at its lower end to the main frame 10 at 142 by means of the apertured ear 68 on the wheel support structure 14 and pivotally connected at its opposite end to the guide arm 104 at 144, the extension of the cylinder 140 being controlled by an operator-controlled valve 146 which controls the flow of pressurized fluid to and from the cylinder 140 via the line 148, the valve 146 being connected to an engine-driven hydraulic pump 150 and to a fluid reservoir, which is advantageously formed by the hollow beam 13. Similarly, the position of the left guide arm 106 is established by an independent hydraulic cylinder 152, having its lower end connected at 154 to the bracket or ear 68 extending from the left wheel support member 16 and its upper end pivotally connected to the left guide arm 106 rearwardly of the pivot 122. The extension of the cylinder 152 is established by a second operator-controlled valve 158, which controls the flow of pressurized fluid to and from the cylinder via a hydraulic line 160, the valve 158 being associated with a second engine-driven pump 162, although it is connected to a common reservoir with the valve 146.

When the windrower is being operated in certain types of crops such as hay, it is desirable that the crop be cut as close to the ground as possible, and the cylinders 140 and 152 are retracted until the harvesting device or header 40 rides on the ground and the pins 126 are positioned approximately in the middle of the slots 128, as shown in FIG. 3, permitting the platform to rise and fall with the contour of the ground. The springs 130 are adjustable via the adjusting members 132 and 136 so that the springs exert the desired amount of lifting force on the header. Normally the springs are set so that the counterbalance force is slightly less than the weight of the header, the uncounterbalanced weight of the header being supported on the ground. Of course, the deflection of the springs could be increased via the adjusting members 132 and 136, so that the total weight of the header is supported by the springs, although the 100% counterbalanced condition is not the normal operating condition, since the platform would tend to bounce excessively, and could not move downwardly to follow a depression in the ground.

If the lower edge of the header strikes an obstruction or ground irregularity, the force exerted thereby will raise the header to clear the obstruction, the counterbalancing springs aiding the raising of the platform, so that a relatively small force will cause the platform to raise. The distance that the platform or header will raise is of course limited by the length of the slots 128,, the upward movement of the platform being limited by the lower end of the slots 128 engaging the pins 126, the position of which is established by the cylinders 140 and 152. As previously described, there is sufficient play in the mounting mechanism pivots to permit one end of the header to raise independently of the other to clear an obstruction.

To raise the header, the cylinders 140 and 152 are actuated to swing the arms 104 and 106 upwardly, which in turn raises the lower mounting elements 74 and 76 after the pins 126 engage the upper ends of the slots 128. However, this change in header position does not decrease the extension of the springs 130, so that the counterbalancing force exerted thereby is not decreased when the header is raised. In fact, if the header is operated with the pins in the middle slots, as illustrated, there is a slight increase in spring deflection when the header is raised. Thus the series type connection of the lifting cylinders and the counterbalancing springs permits operation of the header at any desired height without the necessity of adjusting the counterbalance springs to obtain sufficient counterbalancing force.

Generally in grain crops, the windrower is operated with the header supported above the ground, in which case the springs 130 are normally adjusted to support most of the header weight, a small portion of the weight being supported by the pins 126 engaging the upper ends of the slots 128, in which case the header will not float downwardly. Of course, 100% counterbalance could be achieved by adjusting the spring so that the pins do not engage the slot ends, but this produces undersirable platform bounce.

When the springs are connected to the forward end of the guide arms parallel to the members 116, as shown in FIG. 3, the opposite ends of the spring move the same amount as the opposite ends of the members 116 once the pins 126 engage the ends of the slots 128, so that the counterbalance is independent of the header position, as previously described. However, in some crops, such as grain, it is desirable to have a lesser counterbalance when the header is raised to reduce the header bounce during normal grain harvesting, when the header is operated off the ground, while providing almost total counterbalance when the header is operated on the ground during the harvest of down grain. To provide this type of counterbalance, the upper ends of the springs 130 are attached to the guide arms 104 and 106 rearwardly of the cylinders 140 and 152, by mounting the brackets 135 to the rearward portion of the guide arms via the alternate holes 133. In this position, the upper ends of the springs 130 move a lesser distance than the lower ends as the header is raised, decreasing the counterbalance force as the header raises.

Although the series connected springs and lifting cylinders in the illustrated embodiment are connected to the header by means of the lower mounting elements 74 and 76, it is to be understood that the springs could be connected directly to the header or that the position of the springs and the lifting cylinders could be reversed within the scope of the invention.

Since the lifting cylinders 140 and 152 are separately actuatable, having separate sources of fluid pressure and control valves, their degree of extension can be different so that the platform will tilt about a fore-and-aft axis as shown in FIG. 4. Since the counterbalance is not decreased by raising the header, the opposite ends of the header will retain the desired amount of counterbalance regardless of the degree of tilt. This of course is especially advantageous when the windrower is being utilized in irrigated areas, since it permits the harvesting of crops growing along irrigation borders without danger of damage to the header.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A self-propelled windrower comprising: a main frame, including a transverse forward portion; a pair of transversely spaced ground-engaging wheels journaled on the frame for supporting the frame above the ground; a transversely elongated harvesting device disposed ahead of the forward frame portion and adapted to cut a swath of crop and return it to the ground in a windrow between the wheels; means mounting the harvesting device on the frame for generally vertical movement thereon; and suspension control means operatively connected to the main frame and the harvesting device for adjusting the harvesting device vertically while permitting independent upward floating movement of either end of the harvesting device, said suspension control means including at least one series connected force-exerting device and a counterbalancing element operative between the frame and the harvesting device.

2. The invention defined in claim 1 wherein the counterbalancing element comprises a spring means deflectable under the weight of the harvesting device to exert an upward counterbalancing force thereon, and the suspension control means includes a stop means operatively associated with the spring means for limiting the deflection of the spring means.

3. The invention defined in claim 2 wherein the mounting means includes first and second generally fore-and-aft extending mounting elements respectively having one end connected proximate to the opopsite ends of the transverse forward portion of the frame and their opposite ends connected to the harvesting device at transversely spaced points, and the suspension control means includes a pair of series connected force-exerting devices and counterbalancing elements respectively associated with the first and second mounting elements and operatively connected to the frame proximate to the opposite ends of the transverse forward frame portion and to the harvesting device at transversely spaced points.

4. The invention defined in claim 3 wherein the force-exerting devices are hydraulic cylinders actuatable separately to independently vertically adjust the opposite ends of the harvesting device or actuatable in unison to vertically adjust the entire harvesting device.

5. The invention defined in claim 4 wherein each counterbalancing element includes a tension spring connected in series with the respective hydraulic cylinder and spring-adjusting means operatively associated with the stop means to selectively vary the maximum amount of spring deflection and the counterbalancing force exerted thereby.

6. The invention defined in claim 5 wherein the series connected hydraulic cylinder and tension springs are respectively connected to the harvesting device by the first and second mounting elements, and hydraulic cylinders and counterbalancing springs are respectively series connected by a pair of transversely spaced fore-and-aft guide arms mounted on the frame for swinging in a vertical fore-and-aft plane.

7. The invention defined in claim 6 wherein the forward frame portion includes a pair of transversely spaced wheel support structures depending from the opposite ends of the forward frame portion and respectively journaling said wheels, and the first and second mounting elements respectively have one end pivotally connected to the opposite wheel support structures for swinging in a fore-and-aft vertical arc and their opposite ends pivotally connected to a lower portion of the harvesting device, and the mounting means also includes a pair of upper mounting links respectively having one end pivotally connected to the forward frame portion generally above said first and second mounting elements for swinging in a fore-and-aft vertical arc and their opposite ends pivotally connected to the harvesting device generally above the lower mounting elements, the upper links and the mounting elements forming a pair of transversely spaced parallel type linkages in conjunction with the frame and the harvesting device.

8. A self-propelled agricultural machine comprising: a main frame including a transverse forward portion; a plurality of wheels journaled on the frame for supporting the frame above the ground; a power source mounted on the frame; a transversely elongated agricultural tool disposed forwardly of the forward frame portoin; means for mounting the agricultural tool on the frame for generally vertical movement of the opposite end portions of the agricultural tool thereon separately or in unison; and suspension control means operatively connected to the main frame and the agricultural tool for vertically adjusting the opposite end portions of the agricultural tool separately or in unison, said suspension control means including first and second independently actuatable hydraulic cylinders respectively operative between the agricultural tool and the frame at transversely spaced points for respectively adjusting the opposite end portions of the agricultural tool separately or in unison.

9. The invention defined in claim 8 and including a separate source of fluid pressure and control valve for each cylinder.

10. The invention defined in claim 8 wherein said mounting means includes first and second mounting elements respectively connected to the frame and the agricultural tool at transversely spaced points and wherein the suspension control means includes first and second counterbalancing elements respectively connected in series with the first and second hydraulic cylinders, the series connected hydraulic cylinders, and counterbalancing elements being respectively associated with the first and second mounting elements and operative to vertically adjust the opposite end portions of the agricultural tool while permitting upward floating movement of the agricultural tool.

References Cited
UNITED STATES PATENTS

| 2,800,760 | 7/1957 | Heth | 56—209 |
|---|---|---|---|
| 3,151,429 | 10/1964 | Dyrdahl | 56—23 |

ANTONIO F. GUIDA, Primary Examiner